United States Patent
Aotake et al.

(10) Patent No.: US 6,819,942 B2
(45) Date of Patent: Nov. 16, 2004

(54) MOBILE COMMUNICATION TERMINAL

(75) Inventors: Yusuke Aotake, Hino (JP); Satoshi Nishimura, Hachioji (JP); Takehiko Tanaka, Akishima (JP); Yuji Umemoto, Hino (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 460 days.

(21) Appl. No.: 10/102,834

(22) Filed: Mar. 22, 2002

(65) Prior Publication Data

US 2003/0013499 A1 Jan. 16, 2003

(30) Foreign Application Priority Data

Jul. 12, 2001 (JP) ........................................ 2001-212719

(51) Int. Cl.$^7$ ............................. H04B 1/38; H04M 1/00
(52) U.S. Cl. ................. 455/556.1; 455/557; 455/569.1; 455/575.2
(58) Field of Search ........................... 455/550.1, 552.1, 455/556.1, 557, 569.1, 575.1, 575.2

(56) References Cited

U.S. PATENT DOCUMENTS

| | | | | |
|---|---|---|---|---|
| 5,491,507 A | * | 2/1996 | Umezawa et al. | 348/14.02 |
| 5,893,037 A | * | 4/1999 | Reele et al. | 455/556.1 |
| 6,122,526 A | * | 9/2000 | Parulski et al. | 455/556.1 |
| 6,253,093 B1 | * | 6/2001 | Yoshikawa | 455/557 |
| 6,681,120 B1 | * | 1/2004 | Kim | 455/556.1 |

* cited by examiner

Primary Examiner—Simon Nguyen
(74) Attorney, Agent, or Firm—Oblon, Spivak, McClelland, Maier & Neustadt, P.C.

(57) ABSTRACT

In a mobile communication terminal according to an aspect of the invention, it is detects whether an external unit is connected to an earphone jack. If it is detected that an external unit is connected to the earphone jack, it is determined whether the external unit is an earphone unit or an electronic flash unit. If the external unit is the electronic flash unit, an audio path provided in the terminal to transmit an audio signal within the terminal will be connected to a microphone and a speaker provided in the terminal.

13 Claims, 5 Drawing Sheets

MOBILE COMMUNICATION TERMINAL

CROSS-REFERENCE TO RELATED APPLICATIONS

This application is based upon and claims the benefit of priority from the prior Japanese Patent Application No. 2001-212719 filed Jul. 12, 2001, the entire contents of which are incorporated herein by reference.

BACKGROUND OF THE INVENTION

1. Field of the Invention

The present invention relates to a mobile communication terminal such as a mobile telephone or PDA (Personal Digital Assistant), and particularly to a mobile communication terminal that comprises a camera.

2. Description of the Related Art

In recent years, mobile communication terminals such as mobile telephones or PDAs have come into use in increasing numbers. Among them is a mobile communication terminal comprising a camera. The mobile communication terminal has a box-shaped housing. The camera is provided at, for example, the upper part of the housing or on the back thereof. The camera incorporates a solid-state photographing element such as a CCD (Charge Coupled Device) or a CMOS (Complementary Metal Oxide Semiconductor). A still picture or a moving picture photographed by the camera is stored in a memory or transmitted to the terminal of a user who is the other party of communication. The mobile communication terminal can transmit the image data representing, for example, the user's portrait, the surrounding scenery, brochures, pictures, catalogs and the like to the terminal of the other user who is the other party of the communication. In view of this, the mobile communication terminal is very convenient.

Generally, cameras comprises but a limited number of components and have but a limited photosensitivity, because they should not be too large and their prices should not be too high. A camera can hardly provide pictures of desired quality when it is used at night or in dark rooms.

The inventors hereof have proposed a mobile communication terminal to which an electronic flash unit (hereinafter referred to as "flash unit") can be coupled, as is disclosed in Japanese Patent Application No. 2001-179007. More precisely, the flash unit can be coupled to and removed from the earphone jack provided in the mobile communication terminal. The terminal is designed so that the flash unit coupled to the terminal may be charged from the power source incorporated in the terminal via the earphone jack. The flash unit can emit light the moment the user depresses the shutter button provided on the mobile communication terminal. Thus, the flash unit serves to achieve flash photographing whenever desired, while coupled to the mobile communication terminal. The terminal can therefore provide high-quality photographs even at night or in dark rooms, and the like. The mobile communication terminal is, however, disadvantageous in the following respect.

As in most mobile communication terminals, an audio path can be automatically switched in the terminal, from the microphone and the speaker to the earphone jack, when an earphone plug is inserted into the earphone jack. If the flash unit is left coupled to the earphone jack, the microphone and the speaker remain disconnected from the audio path. In this condition, the user cannot make an outgoing call or respond to an incoming call if any.

BRIEF SUMMARY OF THE INVENTION

An object of the present invention is to provide a mobile communication terminal in which a microphone and a speaker can operate even if a flash unit remains coupled to the mobile communication terminal.

In order to achieve the above object, according to an aspect of the invention, in a mobile communication terminal which determines whether an external unit is connected to an earphone jack and whether the external unit, if connected to the earphone jack, is an earphone unit or an electronic flash unit. If the external unit connected to the earphone jack is the electronic flash unit, an audio path for transmitting audio signals will be connected to the microphone and speaker that are provided in the terminal.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate embodiments of the invention, and together with the general description given above and the detailed description of the embodiments given below, serve to explain the principles of the invention.

DETAILED DESCRIPTION OF THE INVENTION (First Embodiment)

Figure 1:
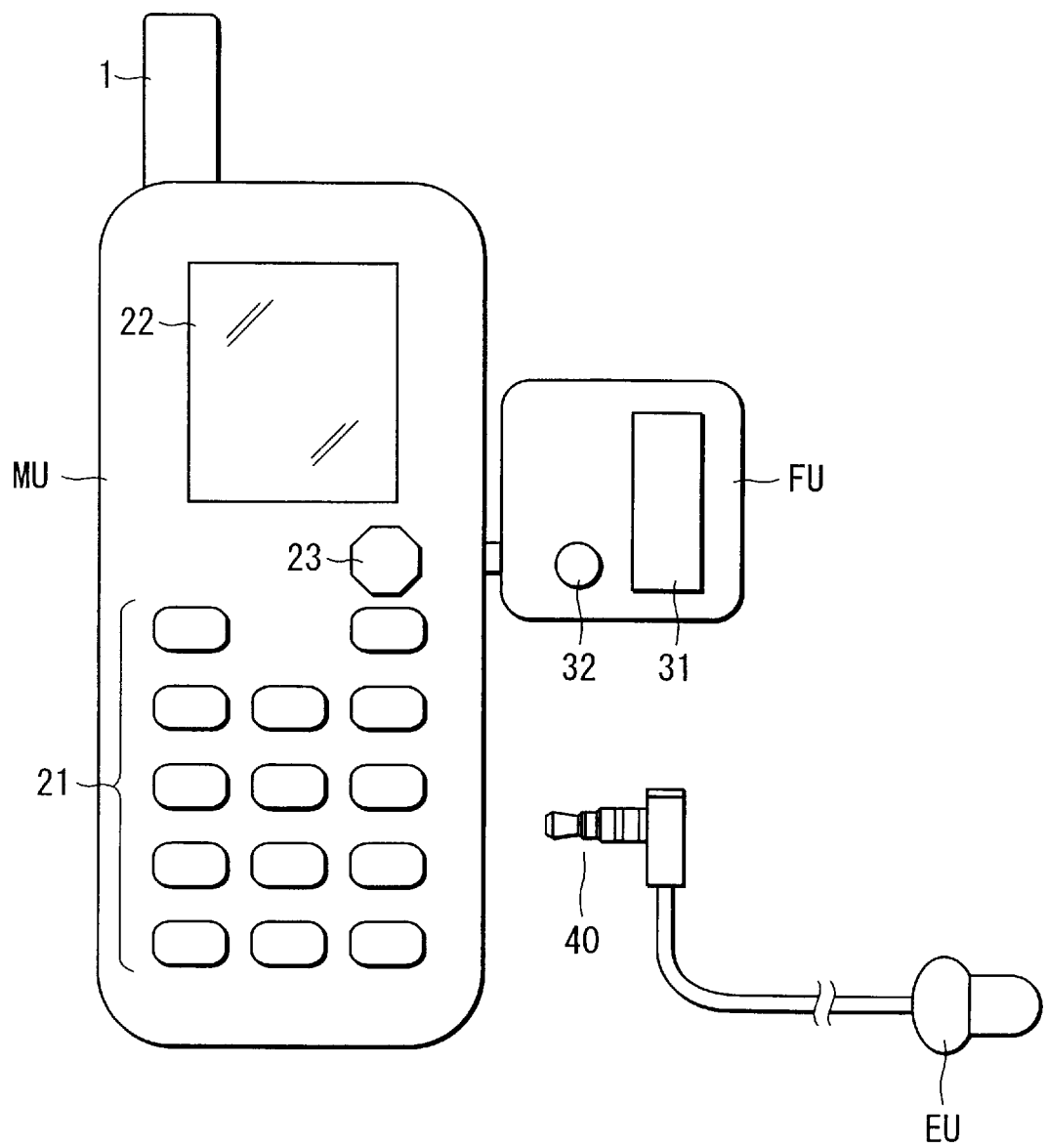
FIG. 1 shows a mobile communication terminal according to a first embodiment of the invention.

FIG. 1 shows a mobile communication terminal that is the first embodiment of the invention and comprises a box-shaped housing and a camera incorporated in the housing.

On the front of the box-shaped housing, a key input section 21, a display section 22, and a camera 23 are provided. An antenna 1 is provided on the upper part of the housing. Moreover, an earphone jack is provided in a side of the housing. A flash unit FU can be removable coupled to the earphone jack. On the front of the flash unit FU, a light-emitting section 31 and a charge indicator 32 are provided. The charge indicator 32 is, for example, a neon tube.

Figure 2:
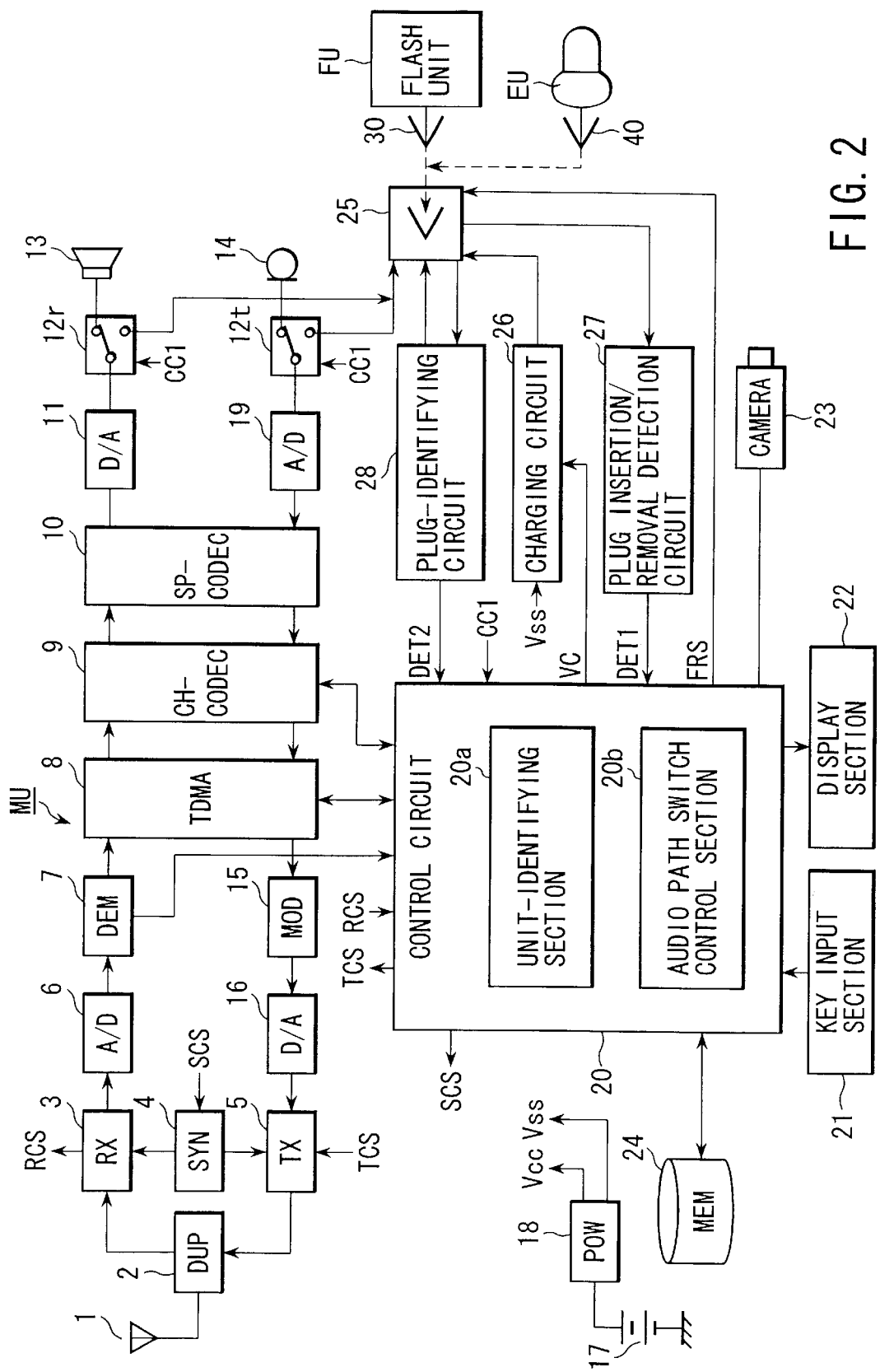
FIG. 2 is a block diagram showing the circuit structure of the mobile communication terminal shown in FIG. 1.

FIG. 2 is a block diagram showing the circuit structure of the mobile communication terminal MU.

As FIG. 2 shows, the antenna receives a radio signal transmitted a base station (now shown) via a radio channel. In the terminal MU, the radio signal is input to a receiving circuit (RX) 3 via a duplexer (DUP) 2. The receiving circuit 3 mixes the radio signal with a local oscillation signal, thus down-converting the radio signal to an intermediate-frequency signal. The local oscillation signal has been generated by a frequency synthesizer (SYN) 4, which is controlled by a control SCS output from a control circuit 20. An A/D converter 6 including a low-pass filter converts the intermediate-frequency signal to a digital signal. The digital signal is input to a digital demodulation circuit (DEM) 7.

The digital demodulation circuit 7 performs frame synchronization and bit synchronization on the digital affix intermediate-frequency signal. The circuit 7 demodulates the digital intermediate-frequency signal, generating a base-band signal. The base-band signal is input to a TDMA (Time Division Multiple Access) circuit 8. The TDMA circuit 8 extracts a timeslot from each transmission frame of the base-band signal. Information about the frame synchronization and the bit synchronization, acquired at the above-mentioned digital demodulation circuit 7, is notified to the control circuit 20.

The base-band signal extracted from the TDMA circuit 8 is input to a channel codec (CH-CODEC) 9. In the channel codec 9, the base-band signal undergoes error correction decoding. In a data communication mode, information data such as an e-mail is inserted into the base band signal that. In a speech mode, speech data is inserted into the base band signal.

The speech data is input to the speech codec (SP-CODEC) 10. The speech codec 10 performs a voice decoding process on the base-band signal, reproducing a digital call-receiving signal. A D/A converter 11 converts the digital call-receiving signal into an analog call-receiving signal. The analog call-receiving signal is input to a speaker amplifier (not shown) through a switching circuit 12r. Then, the analog call-receiving signal is supplied to a speaker 13. The speaker amplifier provided in the speaker 13 amplifies the signal. The signal amplified is output from the speaker 13.

The information data, such as an e-mail or downloaded data, is input to the control circuit 20. The control circuit 20 stores the information data into a memory (MEM) 24, while decoding the data and displaying the data on the display section 22.

Meanwhile, a user inputs a call-sending signal into a microphone 14. The amplifier (not shown) incorporated in the microphone 14 amplifies the call-sending signal. The call-sending signal amplified is input to an A/D converter 19 via a switching circuit 12t. The A/D converter 19 converts the signal into a digital call-sending signal. The speech codec (SP-COD) 10 performs voice decoding on the digital call-sending signal. More precisely, the echo canceller (not shown) provided in the speech codec 10 cancels the echo component of the signal. Transmission data is thereby acquired.

The transmission data is input to the channel codec (CH-COD) 9. The codec 9 carries out error correction coding on the transmission data. The information data, such as the picture data or the e-mail, output from the control circuit 20 is input to the channel codec 9, too. The information data undergoes the error correction coding. The transmission data output from the channel codec 9 is input to the TDMA circuit 8. The TDMA circuit 8 forms a TDMA transmission frame. Then, the TDMA circuit 8 inserts the transmission data into the timeslot assigned to the mobile communication terminal MU and contained in the formed TDMA transmission frame. The TDMA circuit 8 generates data, which is input to the digital modulation circuit (MOD) 15.

The digital modulation circuit 15 implements digital modulation to the transmission data. The transmission data modulated is input to A D/A converter 16. The converter 16 converts the transmission data into an analog signal. The analog signal is supplied to a transmitting circuit (TX) 5. The digital modulation that the circuit 15 performs is, for example, $\pi/4$ shift DQPSK ($\pi/4$ shifted, differentially encoded quadrature phase shift keying) method.

The transmitting circuit 5 mixes the demodulated transmission data with the local oscillation signal, thereby up-converting the demodulated transmission data into a radio signal. A transmission power amplifier (not shown) amplifies the radio signal to a predetermined transmission power level. The radio signal so amplified is supplied to the antenna 1 via the duplexer 2. The antenna 1 transmits the radio signal toward the base station (not shown).

As indicated above, the mobile communication terminal MU comprises the key input section 21, the display section 22, the camera 23, and the memory (MEM) 24.

The key input section 21 comprises function keys, a dialing key, a shutter key, and a charging key. The function keys include a dispatching key and an ending key. When pushed, the shutter key causes the camera 23 to operate. The charging key is pushed to recharging the flash unit FU. The shutter key and the charging key may be replaced by two of the keys provided for communication, under the control of software.

A liquid crystal display (LCD) is provided on the display section 22. Display data output from the control circuit 20 is displayed on the LCD. The display data includes information data such as an e-mail or picture data, management data such as a phone book or a transmission/reception history, and pikt information indicating the operating state of the device, such as the received electric field intensity or an amount of remaining battery.

The camera 23 uses a solid-state imaging element such as a CCD (Charge Coupled Device) or a CMOS (Complementary Metal Oxide Semiconductor), and it is controlled by the control circuit 20. The memory 24 is, for example, a RAM or a flash memory. The memory 24 stores the phone book, or the e-mail received, or the data downloaded from the terminal of the user who is the other party of the communication or from an information site. The memory 24 holds the picture data acquired by the camera 21, the e-mail transmitted, and the like.

A power circuit 18 generates a power-supply voltage Vcc and a charging voltage Vss from the output voltage of a battery 17 that is composed of a secondary battery. The power-supply voltage Vcc is necessary for the operation of the respective circuits of the mobile communication terminal MU. The charging voltage Vss is necessary for charging the flash unit FU.

The mobile communication terminal MU comprises an earphone jack 25, a charging circuit 26, a plug insertion/removal detecting circuit 27, and a plug-identifying circuit 28. The jack 25 and the circuits 26, 27 and 28 are used to drive the flash unit FU incorporated in the terminal.

The earphone jack 25 can hold an earphone unit EU. The jack 25 may hold the flash unit FU, too. The earphone jack 25 is connected to the D/A converter 11 and the A/D converter 19 by means of the switching circuits 12r and 12t. The switching circuits 12r and 12t are controlled by a control signal CC1 output from the control circuit 20.

The charging circuit 26 receives the charging voltage Vss from the power circuit 18 and applies the same, only for the charging period designated by a controlling signal VC supplied from the control circuit 20. The control signal VC may designate two charging periods, for which the charging voltage Vss may be applied. The first charging period (for example, 15 seconds) is long enough for charging the flash unit FU from the uncharged state to a fully-charged state. The second charging period (for example, 10 seconds) is long enough for charging the flash unit FU from a partially-discharged state to the fully-charged state.

The plug insertion/removal detecting circuit 27 can detect the insertion and removal of the connector plug of the earphone unit or the connector plug of the flash unit FU, into and from the earphone jack 25. Upon detecting the insertion or removal of the either connector plug, the circuit 27 generates a detection signal DET1. The signal DET1 is supplied to the control circuit 20.

The plug-identifying circuit 28 applies an identification signal to a specific terminal of the earphone jack 25 when the plug insertion/removal detecting circuit 27 detects the insertion of the plug. Then, the circuit 28 determines whether identification signal is returned, as detected voltage, from the flash unit FU through any other specific terminal. If the circuit 28 determines that the identification signal has been returned, it generates a plug-insertion signal DET2. This signal DET2 is supplied to the control circuit 20.

The control circuit 20 comprises a microcomputer. More precisely, the circuit 20 comprises not only ordinary control sections such as a radio access control section or a call control section, but also special control sections such as a unit identifying section 20a and an audio path switch control circuit section 20b.

The unit identifying section 20a receives the detection signal DET1 output from the plug insertion/removal detecting circuit 27 and detects that connector plugs 30 and 40 are installed to the earphone jack 25. When the section 20a detects the insertion of the connector plugs 30 and 40, it determines which external unit, the earphone unit or the flash unit FU, has been inserted into the earphone jack 25, from the plug-insertion signal DET2 supplied from the plug-identifying circuit 28.

The audio path switch control circuit function 20b controls the connection of the audio path in accordance with the result obtained by the unit identifying section 20a. That is, if the external unit is the earphone unit EU, the audio path, i.e., D/A converter 11 and A/D converter 19, is connected to the earphone jack 25. If the installed external unit is the flash unit FU, the D/A converter 11 and the A/D converter 19 are connected to the speaker 13 and the microphone 14, respectively.

Figure 3:
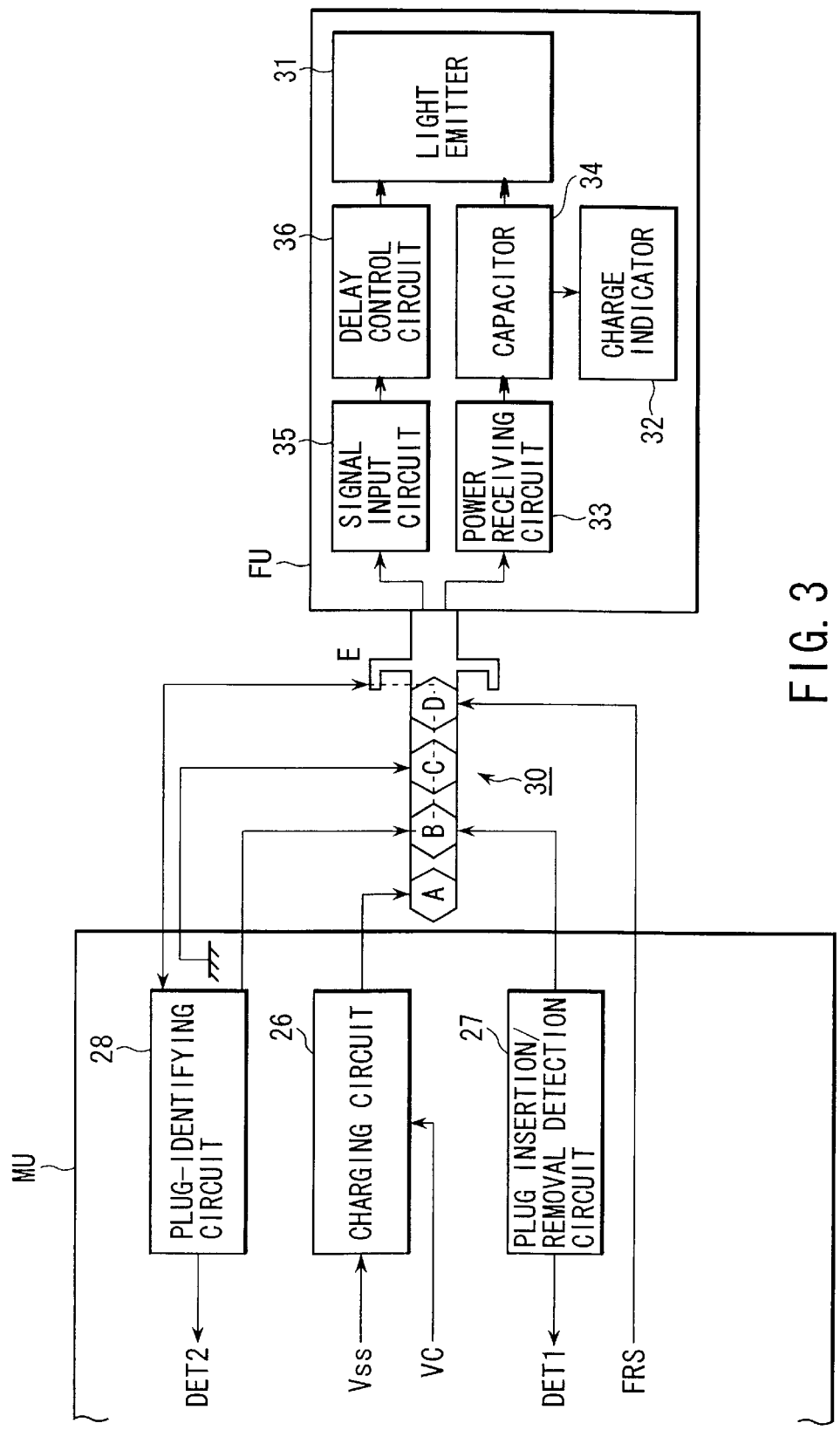
FIG. 3 is a block diagram of the main components of the mobile communication terminal shown in FIG. 2.

The flash unit FU and the connector plug 30 will be described, with reference to FIG. 3.

The flush unit FU comprises a light emitter 31, a charge indicator 32, a receiving circuit 33, a capacitor 34, a signal input circuit 35, and a delay control circuit 36. The light emitter 31 may be a flash lamp. The charge indicator 32 may be a neon tube.

The receiving circuit 33 receives the charging voltage Vss from the charging circuit 26 of the mobile communication terminal MU and applies the voltage Vss to the capacitor 34. The capacitor 34 is thereby charged. The signal input circuit 35 receives a light-emission control signal FRS from the control circuit 20 of the mobile communication terminal MU. The delay control section 36 receives a light emission control signal FRS from the signal inputting section 35, delays the signal FRS by a preset delay time, and supplies the signal FRF, thus delayed, to the light emitter 31. Therefore, the capacitor 34 is discharged and the light emitter 31 emits light.

Figure 5A:
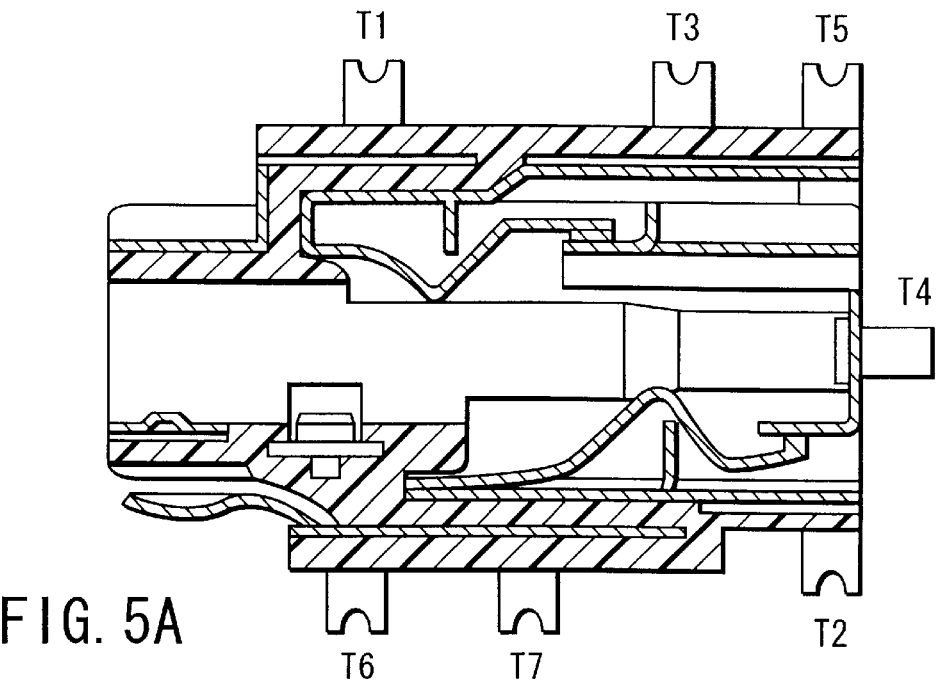
FIG. 5A is a sectional view of the earphone jack used as a connector in the mobile communication terminal shown in FIGS. 1 and 2.
Figure 5B:
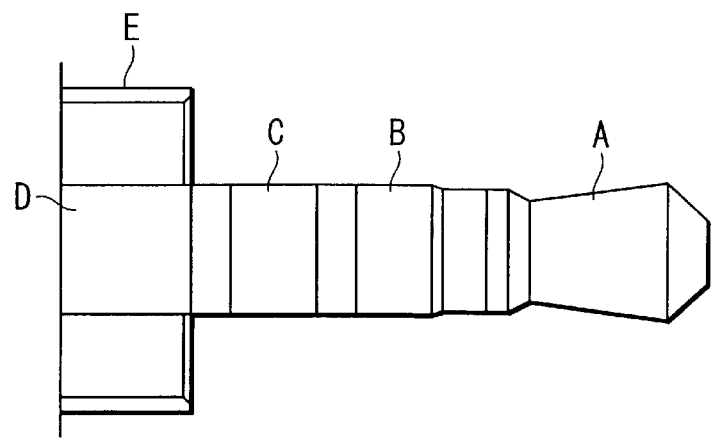
FIG. 5B shows the flash unit plug used as a connector in the mobile communication terminal shown in FIGS. 1 and 2.
Figure 6:
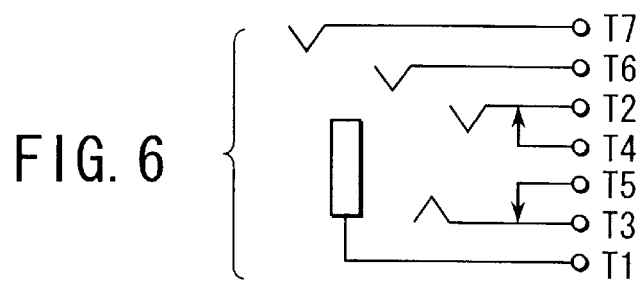
FIG. 6 is a circuit diagram of the earphone jack shown in FIG. 5A.

The connector plug 30 comprises five terminals A, B, C, D, and E that are in a line from the edge in the order mentioned. The plug 30 is inserted to the earphone jack 25. The earphone jack 25 has seven terminals that help to accomplish stereo audio output and microphone input. FIG. 5A is a sectional view of the earphone jack 25. FIG. 5B is a side view of the connector plug 30. FIG. 6 illustrates the circuit provided in the earphone jack 25.

The terminal A of the connector plug 30 is used to receive the charging voltage Vss. It contacts a terminal T2 arranged at the deepest section of the earphone jack 25. The terminal T2 provided at the deepest section of the earphone jack 25 serves as a charging terminal, because any terminals other than the terminal A should not contact the terminal T2 while the connector plug 30 is being inserted into or removed from the earphone jack 25.

The terminal B is used to detect the insertion/removal of the plug and to receive the plug-insertion signal. The terminal B contacts the terminal T3 of the earphone jack 25. The terminal C is used as an earth terminal and contacts the terminal T6 of the earphone jack 25. The terminal D is used to receive the light-emission control signal FRS and contacts the terminal T1 of the earphone jack 25.

The terminal E is connected to the terminal B in the connector plug 30 and contacts the terminal T7 of the earphone jack 25. In the connector plug 30 thus constructed, the plug-insertion signal DET2 supplied to the terminal B is returned as a voltage to the plug-identifying circuit 28 via the terminal T7 of the earphone jack 25.

Figure 4:
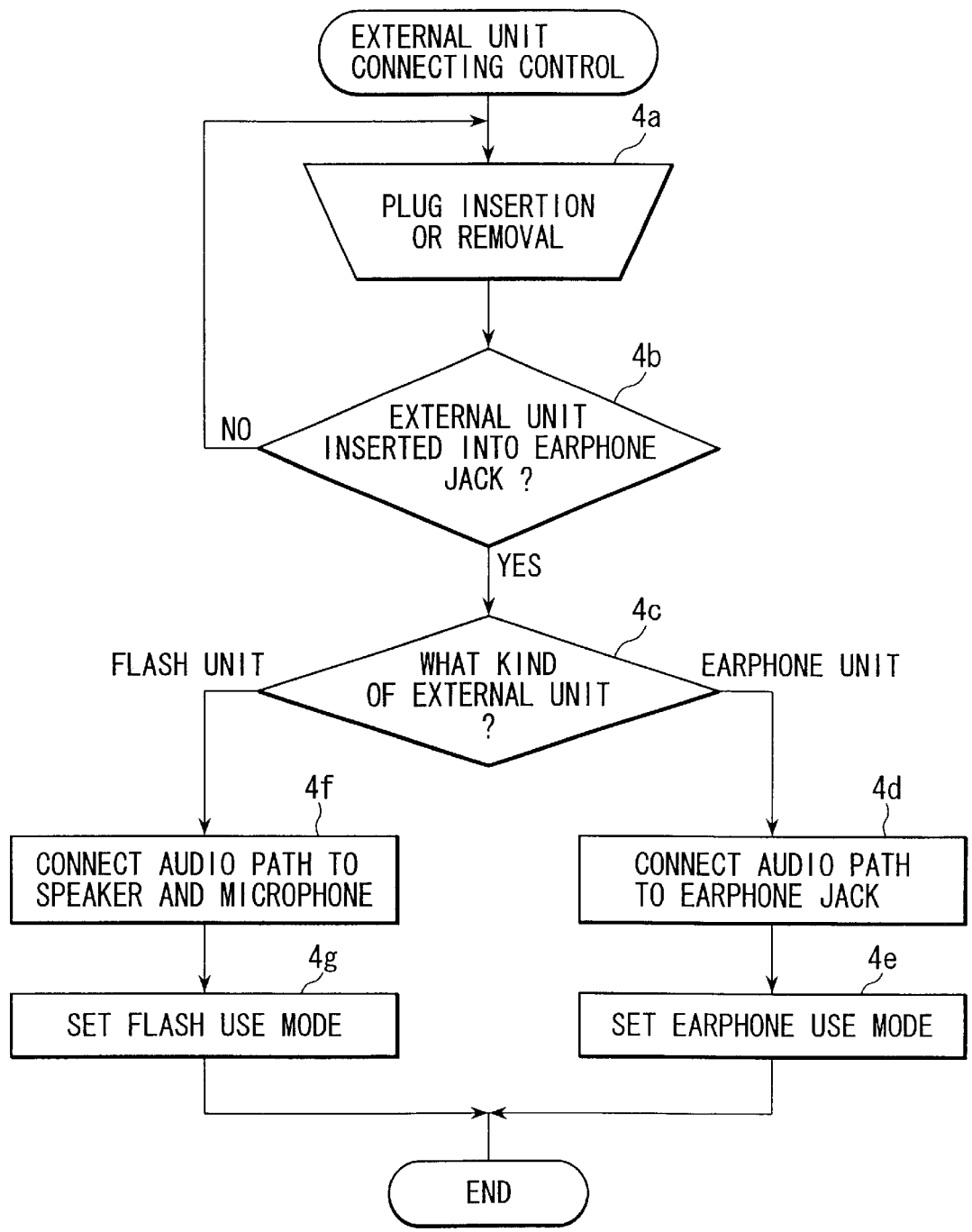
FIG. 4 is a flowchart showing a process of identifying the external unit and a process of controlling connecting an audio path.

It will be described how the mobile communication terminal MU operates. FIG. 4 is a flowchart explaining how the external unit is identified.

At step 4b, the control circuit 20 of the mobile communication terminal MU monitors the insertion of the connector plug of the external unit into the earphone jack 25. Assume that the user inserts the plug 40 of the earphone unit EU into the earphone jack 25 at a step 4a, in order to make a call or reproduce audio data by using the earphone unit EU.

Then, the plug insertion/removal detection circuit 27 generates a plug-insertion signal DET1, which is supplied to the control circuit 20. From the plug-insertion signal DET1 the control circuit 20 determines at step 4b that the plug of an external unit is inserted in the earphone jack 25. When the plug is inserted in the earphone jack 25, the plug-identifying circuit 28 generates a plug-insertion signal, which is supplied from to the terminal B of the connector plug. If the plug is the plug 40 of the earphone unit EU, the plug-insertion signal is not returned to the mobile communication terminal MU.

At step 4c, the control circuit 20 determines that the installed external unit is the earphone unit EU, because the plug-insertion signal is not returned. At step 4d, the control circuit 20 connects the audio path, i.e., D/A converter 11 and A/D converter 19, to the earphone jack 25. At step 4e, the circuit 20 changes the operation mode of the terminal MU to the earphone mode. At the same time, the circuit 20 causes the LCD of the display section 22 to display a message or a symbol indicating that the terminal MU has been set into the earphone mode.

When the user starts communication with any other terminal user, the D/A converter 11 may receive a call-receiving signal transmitted from the other user's terminal.

In this case, the D/A converter 11 converts the call-receiving signal to an analog signal. The analog signal is output from the earphone unit EU via the switching circuit 12r and the earphone jack 25. A call-transmitting signal may be input to the microphone of the earphone unit EU. In this case, the call-transmitting signal is input to the A/D converter 19 via the earphone jack 25 and the switching circuit 12t. The A/D converter 18 converts the call-transmitting signal to a digital signal. The digital signal undergoes coding and demodulation before it is transmitted.

When the reproduction of audio data, such as a musical piece, is started, the audio data is read the memory 24, decoded and converted to an analog audio signal. The analog audio signal is output from the earphone unit EU via the switching circuit 12r and the earphone jack 25.

The user can therefore make a call or receive a call and enjoy listing to music, by using the earphone unit EU.

Assume that the user inserts the connector plug 30 of the flash unit FU into the earphone jack 25 of the mobile communication terminal MU to perform flash photographing. As is the case with the earphone unit, the plug insertion/removal detection circuit 27 outputs the detected signal DET1. At step 4a, the control circuit 20 determines from the signal DET1 that the plug of the external unit has been inserted into the earphone jack 25.

When the connector plug 30 is inserted into the earphone jack 25, the plug-identifying circuit 28 generates a plug-insertion signal, which is supplied from to the terminal B of the connector plug. If the plug is the plug 40 of the earphone unit EU, the plug-insertion signal is not returned to the mobile communication terminal MU. If the inserted connector plug is the plug 30 of the flash unit FU, however, the plug-insertion signal is returned to the plug-identifying circuit 28 from the terminal E. This is because the terminal B and the terminal E are connected to each other in the plug 30. The plug-identifying circuit 28 supplies the plug-insertion signal DET2 to the control circuit 20. At step 4c, the control circuit 20 determines from the signal DET2 that the installed external unit is the flash unit FU.

When the insertion of the flash unit FU is detected, the control circuit 20 goes to step 4f. At step 4f, the control circuit 20 connects the D/A converter 11 and the A/D converter 19, to the speaker 13 and the microphone 14 respectively. At step 4g, the control circuit 20 changes the operation mode of the terminal MU to the flash unit mode. Moreover, it causes the LCD of the display section 22 to display two message or symbols at the same time. One message or symbol indicates that the flash unit mode is set. The other message or symbol indicates that the audio path is connected to the speaker 13 and microphone 14.

Assume that the user presses the charging key of the key input section 21 to charge the flash unit FU. By the operation, the control circuit 20 starts the charging control. The charging voltage Vss is applied from the charging circuit 26 to the flash unit FU via the terminal T4 of the earphone jack 25 and the terminal A of the connector plug 30. The capacitor 34 is thereby charged. Thereafter, the user may press the shutter key provided on the mobile communication terminal MU. In this case, the control circuit 20 generates a light-emission control signal FRS. The light-emission control signal FRS is supplied to the signal input circuit 35 of the flash unit FU via the terminal T1 of the earphone jack 25 and the terminal D of the connector plug 30. The light-emission control signal FRS is supplied to the light emitter 31, delayed for a fixed time by the delay control circuit 36. Thus, the charge is applied from the capacitor 34 to the light emitter 31, which emits light.

Assume that an outgoing call or an incoming call is generated while the flash unit FU remains inserted in the earphone jack 25. Then, the mobile communication terminal MU is switched from the flash mode to the speech mode. While temporarily staying in the speech mode, the terminal MU operates as follows.

That is, the speech codec 10 generates call-receiving data, which is supplied to the D/A converter 11. The D/A converter 11 converts the call-receiving data to an analog signal. The analog signal is supplied to the speaker 15 via the switching circuit 12r. The speaker 13 generates a loud call-receiving alarm. On the other hand, the call-transmitting signal generated by the built-in microphone 14 is input to the A/D converter 19 via the switching circuit 12t. The A/D converter 19 converts the call-transmitting signal to call-transmitting data. The call-transmitting data is encoded, demodulated and transmitted from the terminal MU.

Even if the flash unit FU remains inserted in the earphone jack 25, installed, a so-called handset call can be made by using the microphone 14 and the speaker 13 when an outgoing or incoming call is generated.

As described above, this embodiment comprises the control circuit 20 the that includes the unit identifying section 20a and the audio path switch control circuit section 20b. When the insertion of the plugs 40 and 30 into the earphone jack 25 is detected, it is determined which external unit, the earphone unit EU or flash unit FU, is coupled to the earphone jack 25. If the earphone unit EU is coupled to the earphone jack 25, the audio path is connected to the earphone jack 25. If the flash unit FU is coupled to the earphone jack 25, the audio path is connected to the speaker 13 and the microphone 14.

Thus, even if the flash unit FU remains coupled to the earphone jack 25 when an outgoing or incoming call is generated, the user can achieve communication by using the microphone 14 and the speaker 13 and can reproduce the audio data such as a musical piece.

If the external unit inserted in the earphone jack 25 is the earphone unit EU, the earphone jack 25 is automatically connected to the audio path. Therefore, the user can make or receive a call or reproduce the audio data by only using the earphone unit EU, without performing any operation to connect the jack 25 to the audio path.

The LCD of the display section 22 displays the message or symbol, indicating which external unit is inserted in the jack 25 and whether the jack 25 is connected to the audio path is connected. Looking at the LCD, the user can confirm which installed external unit is inserted in the jack 25 and whether the jack 25 is connected to the audio path.

The present invention is not limited to the embodiments described above. Other embodiments can be devised as will be described below.

The plugs of the earphone unit EU and flash unit FU may differ in the structure. Thus, whether the earphone unit EU or the flash unit FU has coupled to the earphone jack 25 can be determined from the structure of the plug inserted in the earphone jack 25.

More specifically, either the plug of the earphone unit EU or the plug of the flash unit FU has a projection on the proximal part, and a sensor is provided in the earphone jack 25. If the earphone unit EU has the projection, it is found inserted in the jack 25 when the sensor detects the projection. If the flash unit EU has the projection, it is found inserted into the jack 25 when the sensor detects the projection.

The present invention can also be applied to mobile information assistants (PDAs), mobile audio players, portable navigation devices, watches and the like, as well as mobile telephones or PHS terminals.

Various changes and modifications can be made without departing from the scope and spirit of the invention, in the type of the mobile communication terminal (one for TDMA system, another for CDMA system), the shape an structure of the earphone unit and flash unit, the structure of the earphone jack, the structure of the plug of either external unit, the method of identifying the external unit coupled to the earphone jack, the method of switching the radio path, and the like.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A mobile communication terminal comprising:
   a microphone;
   a speaker;
   an earphone jack capable of connecting to an external unit;
   an audio path to convey an audio signal in the mobile communication terminal;
   detecting means for detecting the external unit connected to the earphone jack;
   unit-identifying means for determining whether the external unit connected to the earphone jack is an earphone unit or an electronic flash unit, when the detecting means detects the external unit connected to the earphone jack; and
   switching means for connecting the audio path to the microphone and the speaker, when the unit-identifying means determines that the external unit connected to the earphone jack is the electronic flash unit.

2. The mobile communication terminal according to claim 1, wherein, the switching means connects the audio path to the earphone unit by the earphone jack, when the unit-identifying means determines that the external unit connected to the earphone jack is the earphone unit.

3. The mobile communication terminal according to claim 1, wherein the unit-identifying means includes:
   means for supplying a unit-identifying signal via the earphone jack to the external unit connected to the earphone jack;
   means for detecting a response signal that the external unit has output upon receiving the unit-identifying signal; and
   means for determining whether the external unit connected to the earphone jack is the earphone unit or the electronic flash unit, in accordance with whether the response signal has been detected.

4. The mobile communication terminal according to claim 1, wherein the unit-identifying means includes:
   means for detecting a structural feature of a plug of the external unit connected to the earphone jack; and
   means for determining whether the external unit connected to the earphone jack is the earphone unit or the electronic flash unit, in accordance with the structural feature detected of the plug of the external unit.

5. The mobile communication terminal according to claim 1, farther comprising,
   means for informing, to a user of the mobile communication terminal, whether the external unit connected to the earphone jack is the earphone unit or the electronic flash unit.

6. The mobile communication terminal according to claim 1, farther comprising,
   means for informing, to the user of the mobile communication terminal, whether the audio path is connected to the microphone and the speaker or to the earphone jack in accordance with a switching state of the switching means.

7. A mobile communication terminal comprising:
   a connector to which an external unit is to be connected;
   detecting means for detecting whether an external unit is connected to the connector; and
   unit-identifying means for determining whether the external unit is an earphone unit or electronic flash unit, when the detecting means detects that the external unit is connected to the connector.

8. The mobile communication terminal according to claim 7, farther comprising mode control means for setting an earphone mode to enable the earphone unit to operate when the unit-identifying means determines that the external unit is the earphone unit, and for setting a flash mode to enable the electronic flash unit to operate when the unit-identifying means determines that the external unit is the electronic flash unit.

9. The mobile communication terminal according to claim 7, farther comprising flash driving means for supplying a charging current or a light-emission current to the electronic flash unit when the unit-identifying means determines that the external unit connected to the connector is the electronic flash unit.

10. An electronic flash unit comprising:
    a plug to be removably inserted into an earphone jack of a mobile communication terminal;
    a capacitor which receives a voltage applied from the mobile communication terminal via the earphone jack and the plug, and which is thereby electrically charged; and
    a light-emitting section which causes the capacitor to output the charged voltage, in response a light-emission signal supplied from the mobile communication terminal via the earphone jack and the plug, and which emits light upon receiving the charged voltage from the capacitor.

11. The electronic flash unit according to claim 10, wherein the plug includes:
    a first terminal which applies the voltage to the capacitor;
    a second terminal which supplies the light-emission signal to the light-emitting section;
    a third terminal which receives a unit-identifying signal from the mobile communication terminal to identity an external unit inserted in the earphone jack; and
    a fourth terminal which is connected to the third terminal and returns a response signal to the mobile communication terminal, the response signal corresponding to the unit-identifying signal.

12. A mobile communication terminal comprising:
    a microphone;
    a speaker;
    an earphone jack capable of connecting with an external unit;
    an audio path to convey an audio signal in the mobile communication terminal;

a detecting circuit configured to detect that the external unit connected to the earphone jack;

a unit-identifying circuit configured to determine whether the external unit connected to the earphone jack is an earphone unit or an electronic flash unit, when the detecting circuit detects that the external unit connected to the earphone jack; and a switching circuit configured to connect the audio path to the microphone and the speaker when the unit-identifying circuit determines that the external unit connected to the earphone jack is the electronic flash unit.

13. A mobile communication terminal comprising:

a connector to which an external unit is to be connected;

a detecting circuit configured to detect that an external unit is connected to the connector; and a unit-identifying circuit configured to determined whether an external unit connected to the connector is an earphone unit or an electronic flash unit when the detecting circuit detects that the external unit is connected to the connector.

* * * * *